Patented Mar. 13, 1945

2,371,134

UNITED STATES PATENT OFFICE 2,371,134

POLYVINYL HALIDE COMPOSITION

Thomas L. Gresham, Akron, Ohio, assignor to The B. F. Goodrich Company, New York, N. Y., a corporation of New York No Drawing. Application March 1, 1941, Serial No. 381,392

6 Claims. (Cl. 260—36)

This invention relates to polyvinyl halide compositions and pertains specifically to plasticizers which impart desirable properties to these compositions.

Plasticized compositions made from polyvinyl halides are well known as substitutes for rubber where special properties, such as resistance to acids, alkalies, oxidizing agents, oil, or gasoline are desired. These compositions are also useful as electrical insulation especially because of their corrosion resistance and high electrical resistivity. Plasticizers which have commonly been used in these compositions heretofore, such as tricresyl phosphate, dibutyl phthalate, butyl phthalyl butyl glycollate, etc. have, however, certain disadvantages. They are rather easily hydrolyzed when exposed to acids or alkalies, and the electrical resistivities of stocks made with them are undesirably low for insulating materials.

I have now discovered that a new class of plasticizers, the alkyl aryl ketones in which the alkyl group contains at least ten carbon atoms and the aryl group contains at least nine carbon atoms, overcomes these difficulties; among these plasticizers are such compounds as undecyl p-cumyl ketone, tridecyl p-cumyl ketone, pentadecyl p-cumyl ketone, undecyl mesityl ketone, tridecyl mesityl ketone, pentadecyl mesityl ketone, cetyl mesityl ketone, undecyl naphthyl ketone, lauryl naphthyl ketone, tridecyl naphthyl ketone, tetradecyl naphthyl ketone, pentadecyl naphthyl ketone, undecyl xenyl ketone, lauryl xenyl ketone, pentadecyl xenyl ketone, undecyl tetrahydronaphthyl ketone, lauryl tetrahydronaphthyl ketone, tridecyl tetrahydronaphthyl ketone, tetradecyl tetrahydronaphthyl ketone, pentadecyl tetrahydronaphthyl ketone, cetyl tetrahydronaphthyl ketone, and similar materials. It is preferred that the alkyl group contain not more than eighteen carbon atoms, and the aryl group not more than twelve, but this limitation is not critical.

My new compounds may be made most conveniently from an aliphatic acid chloride and the desired aryl hydrocarbon by means of a Friedel-Crafts reaction.

As a specific example of my invention, I have prepared undecyl tetrahydronaphthyl ketone by adding 218 parts by weight of lauryl chloride to a mixture of 500 parts of dry tetralin and 150 parts of aluminum chloride at 10° C. over a period of about an hour. To obtain the best yields it is desirable to hold the temperature of the reaction at about 10° C. until the addition is complete and to stir the mixture thoroughly. The material is then decomposed by pouring into 1000 parts of cold water, and the organic layer which separates is washed, dried, and distilled at reduced pressure. About 95% of the theoretical yield of a ketone boiling at 190° to 220° C. at 1 mm. is obtained.

This plasticizer, when mixed with gamma polyvinyl chloride by the usual methods, that is, on a hot roll mill or in an internal mixer, and molded into sheets at 297° F. gives a resilient, rubber-like stock which has about the same physical properties as a similarly prepared stock made with tricresyl phosphate. However, its stability toward acids and bases, and its electrical resistivity are very greatly improved. My new plasticizers are practically unaffected by treatment with acids or alkalies in any concentration. The composition also exhibits markedly superior flexibility at low temperature. Similar results may be obtained with other plasticizers in this class.

My new plasticizers may be used in the amount of about one-half to four times the amount of polymer in the composition, and may be used to plasticize any polyvinyl halide, such as alpha, beta, or gamma polyvinyl chloride, polyvinyl bromide, or any polymer which is largely a polyvinyl halide such as a copolymer of vinyl chloride with minor proportions of a vinyl ester like vinyl acetate or vinyl cyanide, or with vinylidene chloride. Any method of incorporation of the plasticizer may be used, such as mixing on a hot roll mill or in an internal mixer or merely by heating a mixture of polymer and plasticizer to a temperature substantially above room temperature while stirring. Other plasticizers may be used in conjunction with my new plasticizer in order to obtain special effects. Any of the usual pigments and fillers, such as carbon black, barytes, clay, whiting, etc. which are in common use in the rubber or plastics industries may be included in the composition. If a compound which is unusually stable to light or heat is desired, a special stabilizing agent such as a lead salt of a fatty acid or an ester of an unsaturated fatty acid may also be introduced.

Although I have herein disclosed specific embodiments of my invention, I do not intend to limit myself solely thereto, for many modifications and variations lie within the spirit and scope of the invention as defined in the appended claims.

I claim:

1. A composition of matter comprising a polymer made from a monomeric material consisting substantially of vinyl chloride, and an alkyl aryl ketone in which the alkyl group contains from ten to eighteen carbon atoms and the aryl group from nine to twelve carbon atoms.

2. A composition of matter comprising gamma polyvinyl chloride and an alkyl aryl ketone in which the alkyl group contains from ten to eighteen carbon atoms and the aryl group from nine to twelve carbon atoms.

3. A composition of matter comprising a polymer made from a monomeric material consisting substantially of vinyl chloride and undecyl tetrahydronaphthyl ketone.

4. A composition of matter comprising gamma polyvinyl chloride and undecyl tetrahydronaphthyl ketone.

5. A composition of matter comprising a polymer made from a monomeric material consisting substantially of vinyl chloride, and undecyl p-cumyl ketone.

6. A composition of matter comprising gamma polyvinyl chloride and undecyl p-cumyl ketone.

THOMAS L. GRESHAM.